US010988251B2

(12) United States Patent
Georges

(10) Patent No.: US 10,988,251 B2
(45) Date of Patent: Apr. 27, 2021

(54) ON-BOARD EMERGENCY RESPONSE SYSTEM FOR A VEHICLE

(71) Applicant: Jean Edrice Georges, Boynton Beach, FL (US)

(72) Inventor: Jean Edrice Georges, Boynton Beach, FL (US)

( * ) Notice: Subject to any disclaimer, the term of this patent is extended or adjusted under 35 U.S.C. 154(b) by 0 days.

(21) Appl. No.: 15/829,872

(22) Filed: Dec. 1, 2017

(65) Prior Publication Data

US 2019/0168869 A1    Jun. 6, 2019

(51) Int. Cl.
| | | |
|---|---|---|
| *B64C 39/02* | (2006.01) | |
| *B64D 47/06* | (2006.01) | |
| *B64D 47/08* | (2006.01) | |
| *B64D 45/00* | (2006.01) | |
| *H04L 29/08* | (2006.01) | |

(52) U.S. Cl.
CPC ............ *B64C 39/024* (2013.01); *B64D 45/00* (2013.01); *B64D 47/06* (2013.01); *B64D 47/08* (2013.01); *B64C 2201/127* (2013.01); *B64C 2201/205* (2013.01); *B64C 2201/206* (2013.01); *B64C 2201/208* (2013.01); *B64D 2045/008* (2013.01); *B64D 2045/0085* (2013.01); *H04L 67/12* (2013.01)

(58) Field of Classification Search
CPC . B64C 39/024; B64C 2201/127; B64D 45/00; B64D 47/06; B64D 47/08
See application file for complete search history.

(56) References Cited

U.S. PATENT DOCUMENTS

| | | | | |
|---|---|---|---|---|
| 8,950,698 | B1* | 2/2015 | Rossi | B64C 37/02 244/2 |
| 9,056,676 | B1* | 6/2015 | Wang | B64F 1/00 |
| 9,313,667 | B1* | 4/2016 | Daoura | H04B 7/18504 |
| 9,723,468 | B2* | 8/2017 | Cho | H04W 64/00 |
| 10,169,988 | B2* | 1/2019 | Kozloski | G08G 1/0175 |
| 2013/0233964 | A1* | 9/2013 | Woodworth | B64C 37/02 244/2 |
| 2014/0197280 | A1* | 7/2014 | Smith | B64C 3/10 244/35 R |

(Continued)

FOREIGN PATENT DOCUMENTS

| | | | | | |
|---|---|---|---|---|---|
| WO | WO-2016203322 | A2 | * | 12/2016 | ........... B64C 39/024 |
| WO | WO-2017142520 | A1 | * | 8/2017 | ........... B64C 39/024 |
| WO | WO-2018209375 | A1 | * | 11/2018 | ........... B60R 25/305 |

*Primary Examiner* — Joshua E Rodden

(57) ABSTRACT

An on-board emergency response system for a vehicle include a drone being integrated with a vehicle to become separated only when the vehicle is in trouble or experiencing difficulties. Activation of the drone may be from inside the vehicle or remotely via a communication link. The drone is automatically ejected or activated when abnormal conditions inside or outside the vehicle are detected. The drone may provide a backup communication when needed. Once the drone is ejected from the plane, it then follows the vehicle from above at a predetermined distance. It also sends its location, video and images taken inside and outside the vehicle to the command center. If a disaster is inevitable, the drone then tracks the vehicle all the way to its destination. Since the vehicle's actual location is immediately known to the central command, the rescue team can take off in no time, skipping the search altogether.

10 Claims, 9 Drawing Sheets

(56) References Cited

U.S. PATENT DOCUMENTS

| | | | |
|---|---|---|---|
| 2015/0102154 A1* | 4/2015 | Duncan | B64C 39/022 |
| | | | 244/2 |
| 2016/0214717 A1* | 7/2016 | De Silva | B64D 47/08 |
| 2016/0240020 A1* | 8/2016 | Tang | G07C 5/0866 |
| 2017/0092109 A1* | 3/2017 | Trundle | G08B 25/006 |
| 2018/0029522 A1* | 2/2018 | Gordon | B60Q 1/0017 |
| 2018/0233038 A1* | 8/2018 | Kozloski | G08G 1/0175 |
| 2019/0061663 A1* | 2/2019 | Benmimoun | G07C 5/008 |

* cited by examiner

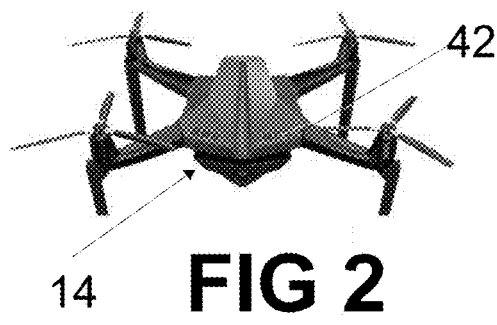
14  FIG 2
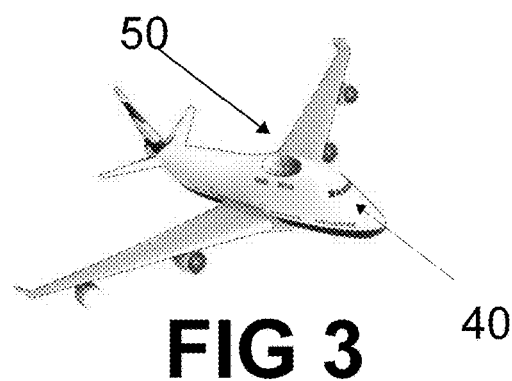
FIG 3  40
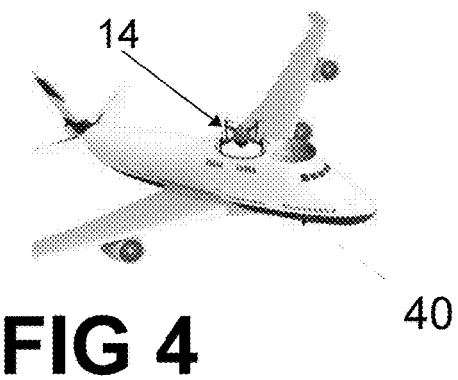
FIG 4  40
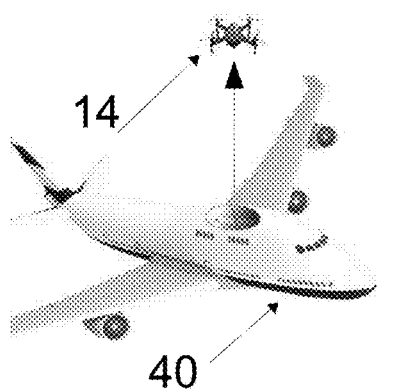
FIG 5

FIG. 21
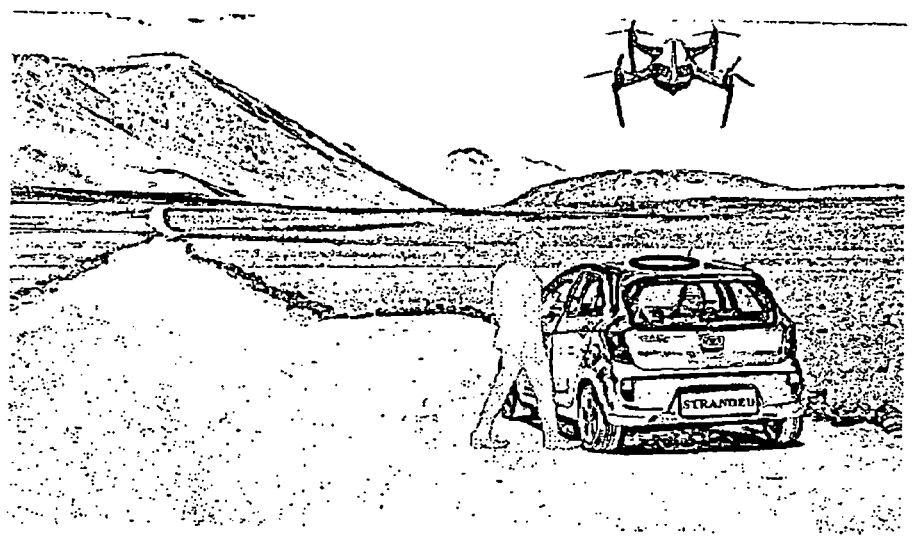
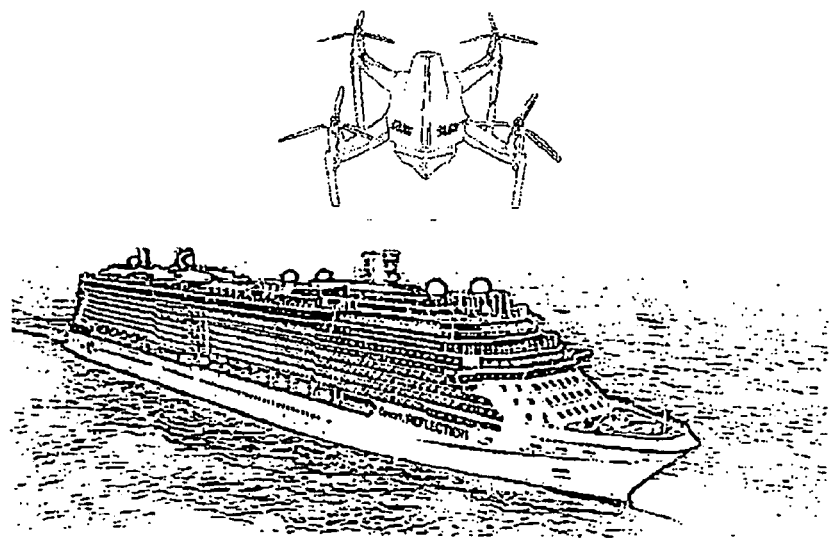
FIG 22

ON-BOARD EMERGENCY RESPONSE SYSTEM FOR A VEHICLE

CROSS REFERENCE TO RELATED APPLICATIONS

This application is also based on provisional application Ser. No. 62/429,790 filed on Dec. 3, 2016.

STATEMENT REGARDING FEDERALLY SPONSORED RESEARCH OR DEVELOPMENT

Not Applicable

DESCRIPTION OF ATTACHED APPENDIX

Not Applicable

FIELD OF THE INVENTION

The present invention relates to an onboard emergency response system for a vehicle and a system designed to physically pinpoint the distressed vehicle's location to a remote station, provide assistance when possible, and track it throughout its troubled path, until said vehicle finally comes to rest or rescued.

BACKGROUND OF THE INVENTION

Distressing conditions onboard any type of vehicle, particularly a passenger vehicle, such as an air vehicle, ship, boat, train, bus, vehicle trailer, or the like, can create confusion and chaos when it occurs. Take the case of an air vehicle like an aircraft, for example, where the pilot may have a few minutes to evaluate and remedy a rapidly degenerating situation onboard. In most cases, power and communication may even failed before the pilot can describe the problem in full details to the air traffic control. Then all a sudden, the aircraft disappeared from the radar, leaving everybody on the ground guessing. The next thing you know is that the plane is reported missing, and most of them have never been found. Here is just a few examples.

Flying Tiger Line Flight 739 was a Lockheed L-1049 Super Constellation propliner chartered by the United States military that disappeared on Mar. 16, 1962, over the Western Pacific Ocean. The aircraft was transporting 93 US soldiers and 3 South Vietnamese from Travis Air Force Base, California to Saigon, Vietnam. After refueling at Anderson Air Force Base, Guam, the Super Constellation was en route to Clark Air Base in the Philippines when it disappeared. All 107 aboard were declared missing and presumed dead.

Pakistan International Airlines Flight 404 was a Fokker F27 Friendship that disappeared shortly after takeoff on 25 Aug. 1989. At 07:36, a domestic scheduled passenger flight of Pakistan International Airlines took off from the northern city of Gilgit, Pakistan on its way to the national capital Islamabad. One of the pilots of the aircraft made a routine radio call at 07:40; this was the last communication with the aircraft. The aircraft is thought to have crashed in the Himalayas, but the wreckage has never been found.

And most recently, Malaysia Airlines Flight 370 (MH370/MAS370), a scheduled international passenger flight operated by Malaysia Airlines, disappeared on 8 Mar. 2014 while flying from Kuala Lumpur International Airport, Malaysia, to Beijing Capital International Airport in China. The aircraft last made voice contact with air traffic control at 01:19 MYT, 8 March (17:19 UTC, 7 March) when it was over the South China Sea, less than an hour after takeoff. It disappeared from air traffic controllers' radar screens at 01:22 MYT. Malaysian military radar continued to track the aircraft as it deviated westwards from its planned flight path and crossed the Malay Peninsula. It left the range of Malaysian military radar at 02:22 while over the Andaman Sea, 200 nautical miles (370 km) north-west of Penang in north-western Malaysia. The aircraft, a Boeing 777-200ER, was carrying 12 Malaysian crew members and 227 passengers from 15 nations. On 24 March, the Malaysian government noted that the final location determined by the satellite communication is far from any possible landing sites, and concluded that "Flight MH370 ended in the southern Indian Ocean".

On 29 Jan. 2015, the Director General of the Department of Civil Aviation Malaysia, Azharuddin Abdul Rahman, announced that the status of Flight 370 would be changed to an "accident", in accordance with the Chicago Convention on International Civil Aviation, and that all passengers and crew are presumed to have lost their lives.

U.S. Pat. No. 7,142,971, System and Method for Automatically Controlling the Path of Travel of a Vehicle, describes a system uniquely designed to take control of an air vehicle in the event of a hijacking. The system however falls short in addressing plane crashes because of mechanical failures or human errors.

Considering the shortfalls of the above described tools and measure, particularly with respect to preventing an aircraft from getting lost despite all the radars and satellites available out there, and to assisting in the event of a hijacking, there is a need in the industry for a system that conclusively prevents the lost or disappearance of a vehicle without a trace. In other words, there is a need for a system that ensures the family of those affected that, despite such a tragedy, there is a chance that efforts will be made to search and find their love one, regardless of the outcome.

SUMMARY OF THE INVENTION

The present invention comprises of a drone system designed, in coordination with a remote station, to automatically locate a distressed vehicle while in operation, to track it and provide assistance when possible, generally consisting of a so-called drone being integrated into a vehicle.

One primary object of the invention is to provide an emergency response system onboard a vehicle.

Another object of the invention is to provide an emergency response system that is mobile and independently operated.

Still, it is another object of the invention to provide an emergency response system that can be activated either by an onboard operator or from a remote location.

Also, another object of the invention is to provide an emergency response system that can transmit accurate location of a vehicle which may be hard to locate through conventional means like radars.

Again, another object of the invention is to provide an emergency response system that can detect a possible danger onboard a vehicle, then detach itself from said vehicle to avoid being damaged, and send emergency information to a communication network.

Furthermore, another object of the invention is to pinpoint where the troubled vehicle is located, and have the information sent remotely to the search and rescue center.

Also, it is another object of the invention to provide an emergency response system that is part of a ground communication network and capable of sending and(or) receiving information to and from the network.

Another object of the invention is to provide an emergency response system which can track a vehicle from above while documenting the event using live videos and images.

It is also another object of the invention to provide to a command center the means of communicating remotely with a vehicle when the latter disappeared from a surveillance system like a radar, while several attempts have been made to contact or re-establish contact with the vehicle have failed.

Another object of the invention is to provide an emergency system with means to help rescue a distressed airplane due to a pilot error. The drone may then perform a quick diagnostic of the air vehicle while roving above it to determine the cause of the problem. Depending of the situation the remote command center may reestablish proper command of the vehicle while preparing for an emergency landing.

Another object of the invention is to provide to a vehicle operator, a second chance by using an onboard mean to re-establish communication with a command center while unable to do so in a conventional way because of current technical problems or other difficulties.

Another object of the invention is to provide a means to document a tragedy that could not be avoided, due to the complexity of the situation, and sent remotely to the command center. Such evidence may include photos and video images from the inside as well as from the outside of the vehicle, and photos and video images of where the vehicle landed, crashed, or rested.

One more object of the invention is to provide a system that can automatically locate a crash site, if any, even in the middle of the night.

Again, another object of the invention is to provide a means, in the event of a disaster, that allows the search and rescue team to get to the crash site sooner for possible life saving intervention, instead of searching for months or even years sometimes, with no result.

Further objects of the invention will be brought out in the following part of the specification, wherein detailed description is for fully disclosing the invention without placing limitations thereon.

BRIEF DESCRIPTION OF THE SEVERAL VIEWS OF THE DRAWINGS

The drawings constitute a part of this specification and include exemplary embodiment to the invention, which may be embodied in various forms. It is to be understood that in some instances various aspects of the invention may be shown exaggerated or enlarged to facilitate an understanding of the invention.

With the above and other related objects in view, the invention consists in the details of construction and combination of parts as will be more fully understood from the following description, when read in conjunction with the accompanying drawings in which:

FIG. 2 illustrates a 3D view of a drone.

FIG. 3 illustrates an air vehicle with a drone housing.

FIG. 4 illustrates an air vehicle with an open drone housing showing the drone itself.

FIG. 5 illustrates an air vehicle showing a drone being ejected from the air vehicle.

FIG. 21 depicts the drone roving over a remote all-terrain vehicle.

FIG. 22 depict a drone roving over a ship at sea.

DETAILED DESCRIPTION OF THE INVENTION

The present invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The system of the present invention applies to any type of vehicle, such as an air vehicle, boat, ship, train, tractor trailer, bus or the like. The embodiments described below, however, are directed toward specific embodiments of a system to help locate and assist a distressed airplane. However, the methods and systems of the present invention apply equally to any other type of vehicle.

Figure 1:
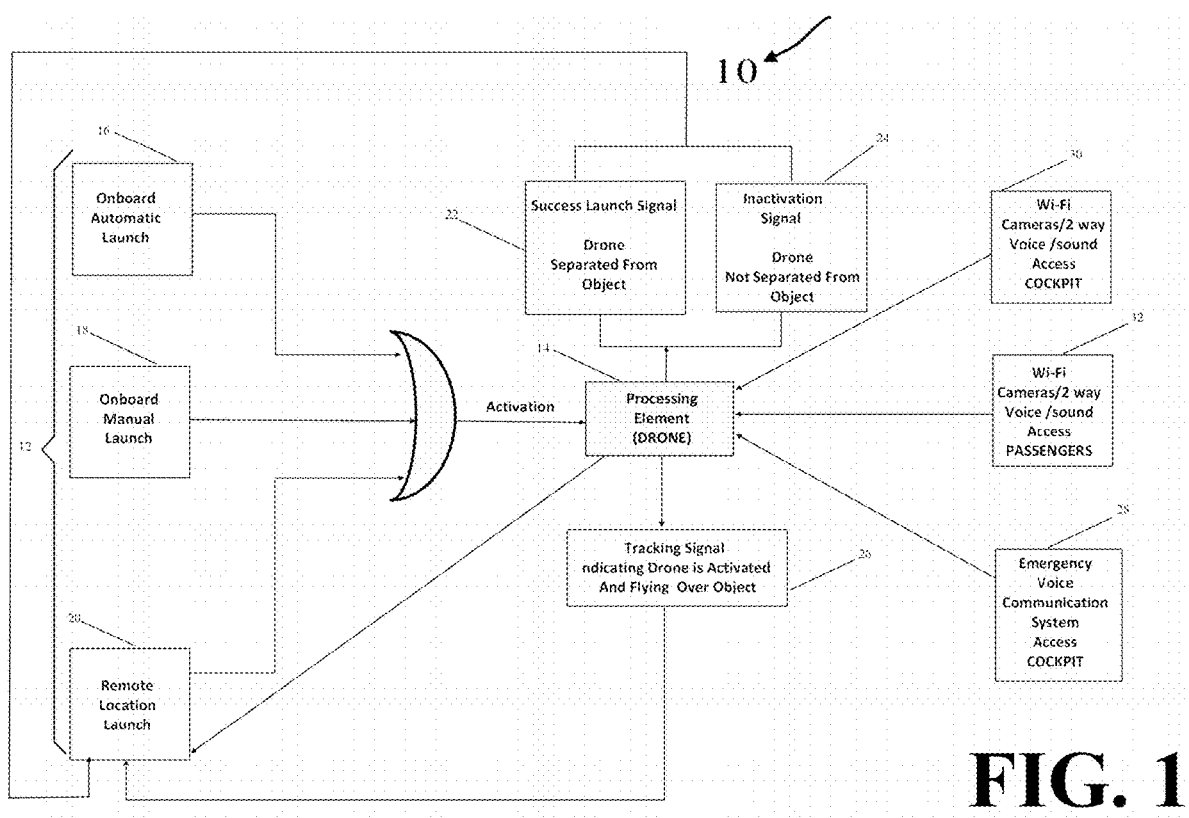
FIG. 1 illustrates a drone activation control system from an air vehicle according to one embodiment of the present invention.
Figure 6:
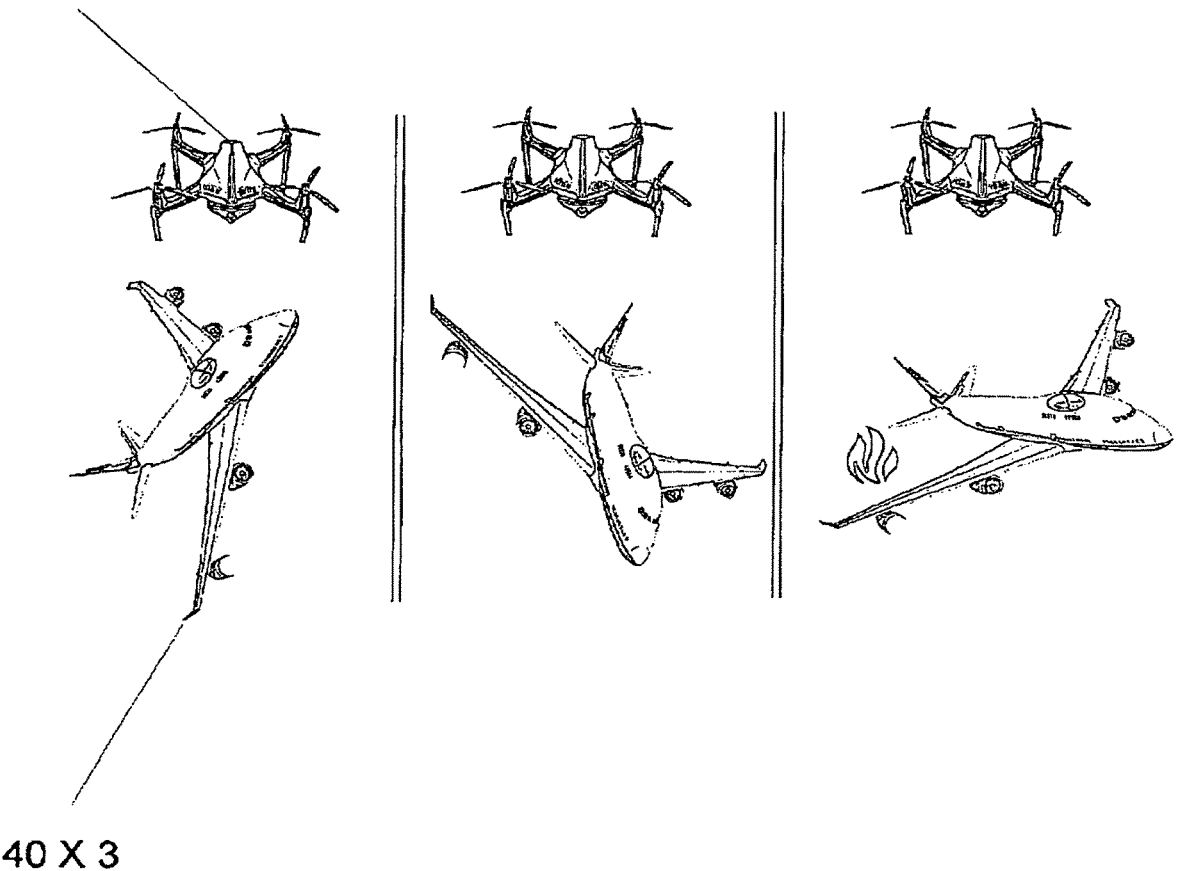
FIG. 6 illustrates multiple positions where a drone can be automatically ejected from the air vehicle.

The present invention will now be described by referencing the appended figures representing preferred embodiments. The embodiment of a system 10 for helping and locate a distressed vehicle includes at least one engagement element 12 and at least one processing element 14, as shown in the embodiments of FIG. 1. An engagement element 12 may be any type of element that initiates the launch of the location system of a vehicle, such as a drone. For example, an engagement element 12 may transmit a signal to the processing element 14 directing engagement of launching the drone. As such, the engagement element may be, but is not limited to, a button, switch, lever, or the like, or any other device capable of transmitting a command to the processing element 14, such as a keyboard, a voice signal receiver, a touch-screen, or a selection device such as a mouse in conjunction with a display. For instance, the location control system 10 may be activated automatically, as represented by box 16 of FIG. 1. In one embodiment, the engagement element 12 may be a sensor or the like that automatically transmits an engagement signal to the processing element 14 upon sensing a particular event. One such event can be the case where the air vehicle or aircraft is in an awkward or abnormal position during the flight as shown in FIG. 6. Such sensors may also be located anywhere in the vehicle 40 where a type of threat to the security of the vehicle or its passengers or other contents may be sensed. For instance, in an aircraft, an engagement sensor may be located proximate to the door of the cockpit, and the sensor may be programmed to transmit an engagement signal to the processing element when there is an attempt to forcibly open the door, such as repeated poundings on the door, and or when an aircraft is in an upside-down position or vice versa. In the case of a cockpit door, the sensor(s) may have a minimum force threshold, such that force applied to the door must exceed the threshold before the automatic drone launch system can be automatically activated. Therefore, at least most inadvertent applications of force on the door by people or objects will not cause the system to automatically engage. In addition to or instead of the automatic engagement element(s) 16, the system 10 may include manual engagement element(s) 18, such as buttons, switches or the like, that authorized personnel, such as the pilots of an aircraft may actuate if a threat is detected. Thus, one or more manual and/or automatic engagement elements may be located onboard vehicle 40, such as within and/or proximate the cockpit of an aircraft as represented by boxes 16 and 18 of FIG. 1.

Figure 7:
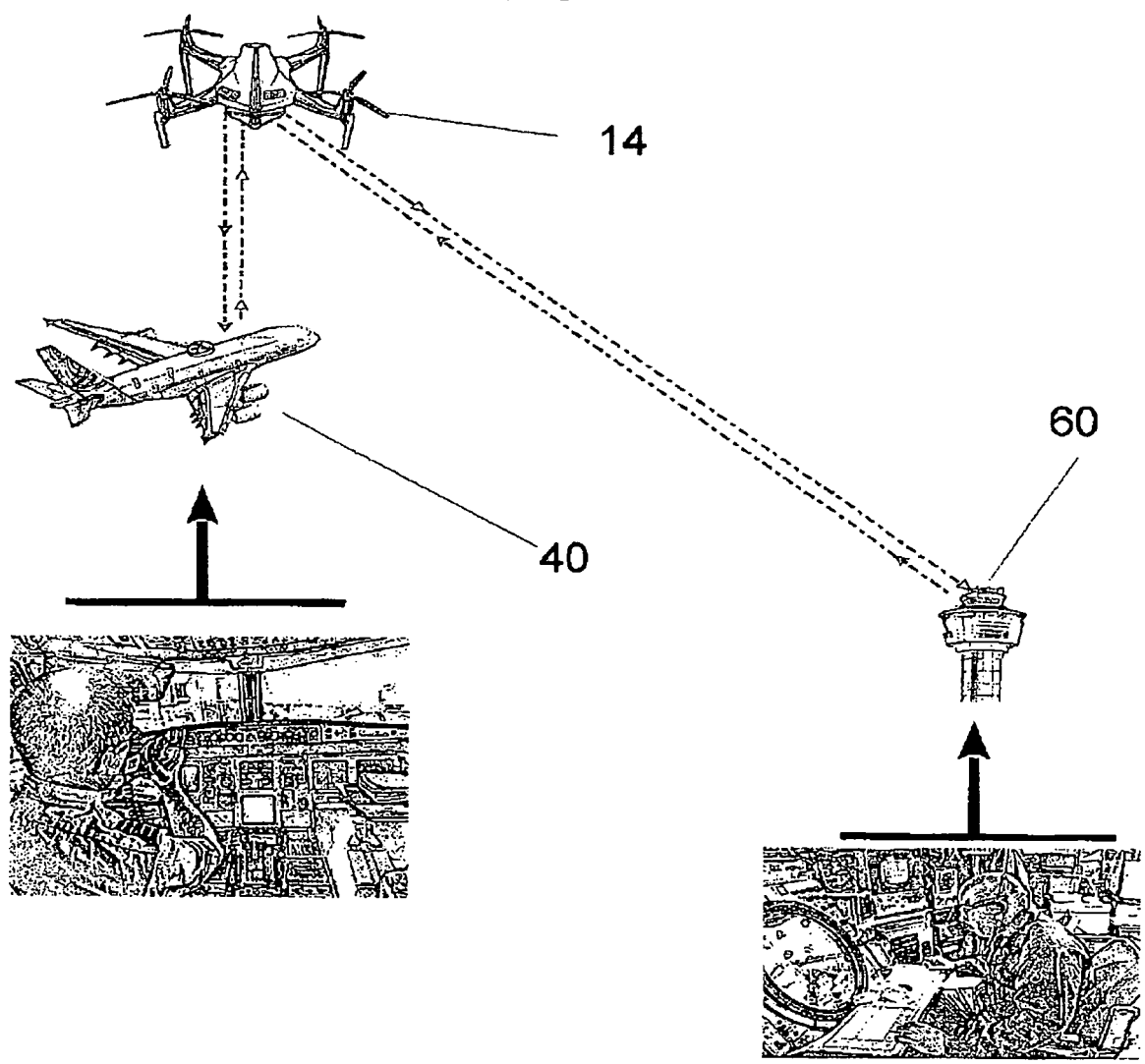
FIG. 7 illustrates a 3-way communication between an air vehicle, a drone, and a command center.

Furthermore, one or more locations outside vehicle 40, i.e., one or more remote international locations from the Coast Guard, the Air Force, or the Navy, on a global scale, but in communication with vehicle 40, as shown in FIG. 7, may include an engagement element, such that if a signal or other communication is received at the remote location that indicates a distress situation, or the security of vehicle 40 may be in jeopardy, the engagement element may activate or launch drone 14, as shown in FIG. 5, from the remote location, as represented by box 20 of FIG. 1 so as to help in correcting any errors if possible, or in determining the gravity of the situation onboard vehicle 40. Personnel and/or equipment at the remote location may monitor the aircraft and may be capable of detecting certain events using onboard Wi-Fi security cameras as represented by box 28, 30, and 32 of FIG. 1, and also depicted in FIGS. 8, and 9. If processing element (drone) 14 is activated because of a vehicle malfunctions such as engine failure, fire, and a catastrophe is therefore imminent, then the drone 14 should be automatically ejected from the air vehicle and be able to track vehicle 40 all the way to the end, using a predetermined distance above vehicle 40 as shown in FIG. 5.

Figure 8:
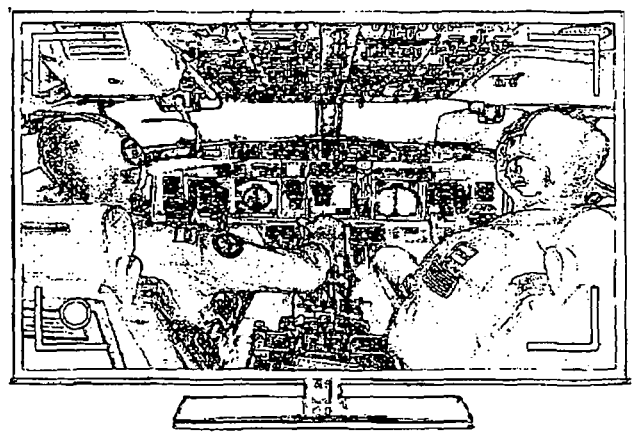
FIG. 8 illustrates a view of the air vehicle's cockpit.
Figure 9:
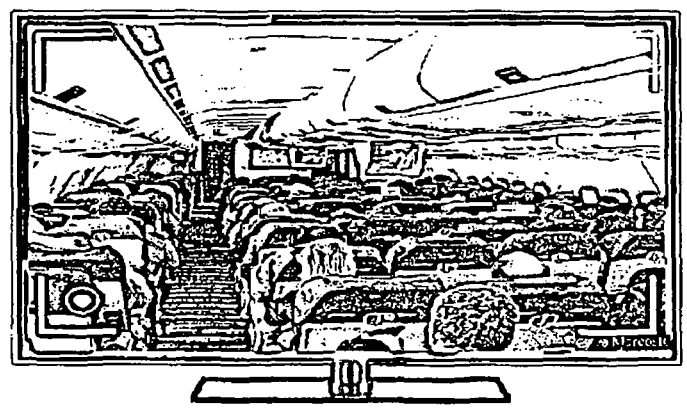
FIG. 9 illustrates a view of the air vehicle's passenger's area.

After drone 14 is launched from vehicle 40, images showing a glimpse of the condition of vehicle 40 from the inside out, including the cockpit, can be sent through the drone to the special unit team on the ground as shown in FIGS. 8 and 9.

Figure 10:
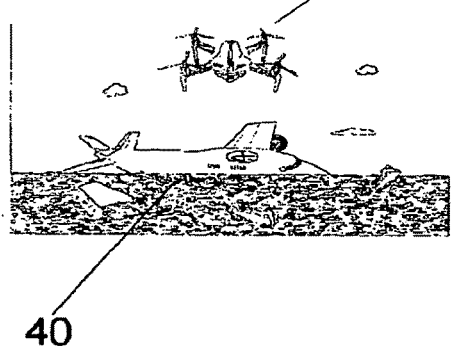
FIG. 10 illustrates a drone roving over an air vehicle crashed on water.
Figure 11:
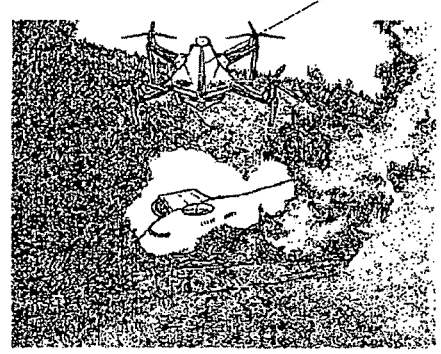
FIG. 11 illustrates a drone roving over an air vehicle crashed on land.

Since the drone is designed to follow vehicle 40 where ever it goes once launched, it might end up floating where ever vehicle 40 may be landing, above water or land. If above the water, drone 14 is also equipped with water sensor that would prevent it from chasing vehicle 40 deep under the ocean. Instead, it will keep tracking vehicle 40 from above at a predetermined distance from the water, as shown in FIG. 10, as the current continues to drag the plane deeper. If sensor's depth limit is reached and the search team is still not at the scene, drone 40 would stay still, where the depth limit was reached. If crash site is on land, drone 14 is equipped with heat and smoke sensors to keep itself far above the crash site as depicted in FIG. 11.

Figure 12:
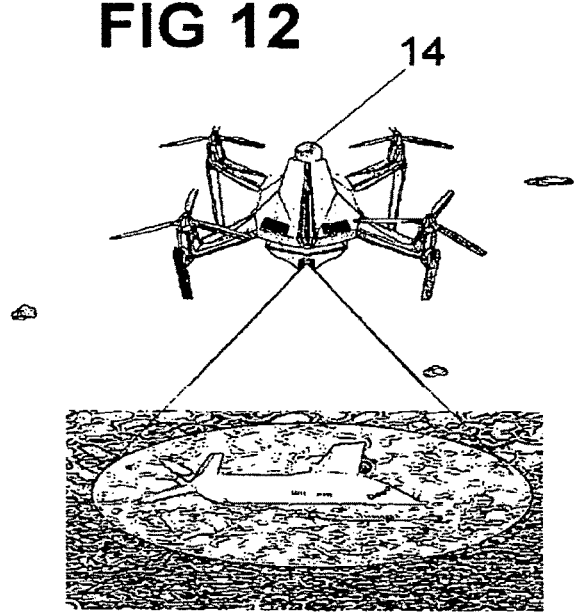
FIG. 12 illustrates a drone providing lightning over a water crash site at night time.
Figure 13:
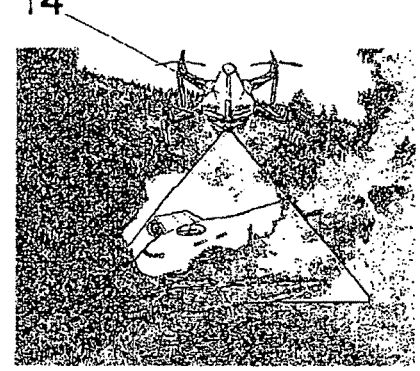
FIG. 13 illustrates a drone providing lightning over a land crash site at night time.

Also, drone 14 has the capability to provide light to the crash sites from above, either on water or on land, using its onboard powerful flash light, as shown in FIGS. 12 and 13.

Figure 14:
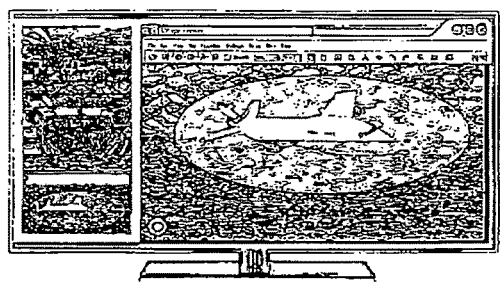
FIG. 14 illustrates a view showing images sent from the drone to the control command center with radar indicating the exact location of the crash.

Drone's 14 Wi-Fi cameras, as depicted in box 30 of FIG. 1, with night vision capability when needed, can transmit live video images to remote location 20 any time of the day, giving a glimpse of the state of vehicle 40 just moment after the crash, as shown in FIG. 14.

Figure 15:
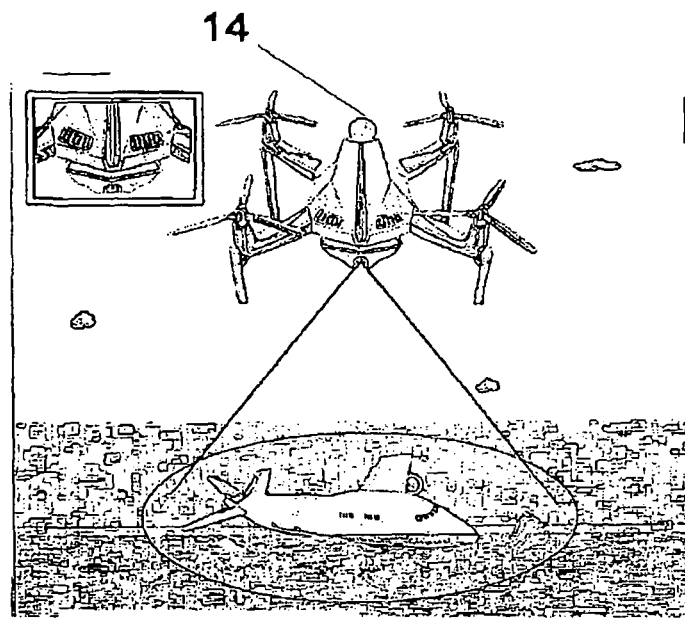
FIG. 15 illustrates a view of the drone's solar power capability.
Figure 15A:
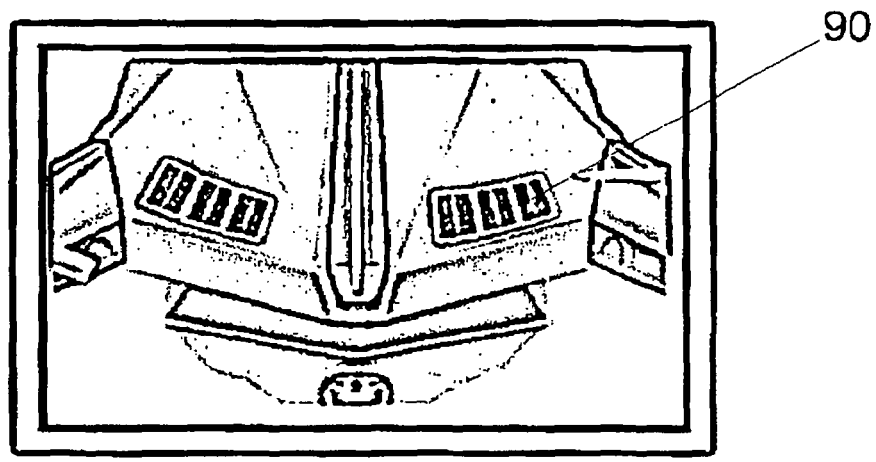
FIG. 15A illustrates view detailing the drone's thin solar cells.

Beside long-lasting batteries, drone 14 is also equipped with mini solar cell 42, power backup in the event more time is needed for the rescue team to arrive, providing that sunlight is available as shown in FIG. 15A. In the event drone's battery reaches its lowest preset level, it would automatically be switched to a backup solar power 42. The idea is to maintain sufficient power on board for communication purpose.

Figure 16:
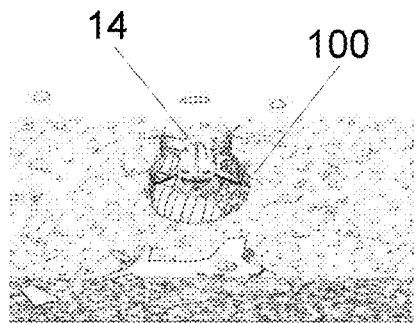
FIG. 16 illustrates a view of the drone landing on water because of lack of power.
Figure 18:
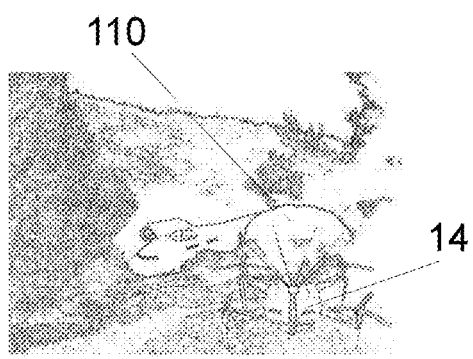
FIG. 18 illustrates a view where the water's search and rescue team arrive at the scene.

In the event solar power 42 is unavailable, and the crash is on land, then drone's 14 onboard emergency parachute 110 would automatically be deployed. Drone 14 will then be programmed to land itself away from the crash site, as shown in FIG. 18. However, if the crash site is on water, drone's 14, built-in inflatable raft 100 would also automatically be deployed, so drone 14 might float over the water surface without the risk of being submerged, as illustrated In FIG. 16.

Figure 17:
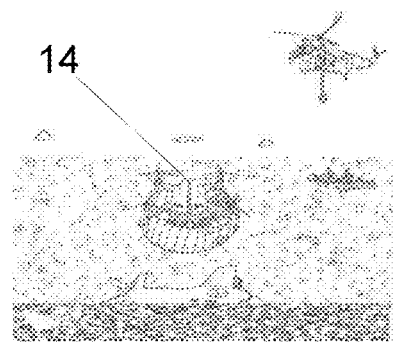
FIG. 17 illustrates a view of the drone landing on land because of lack of power.
Figure 19:
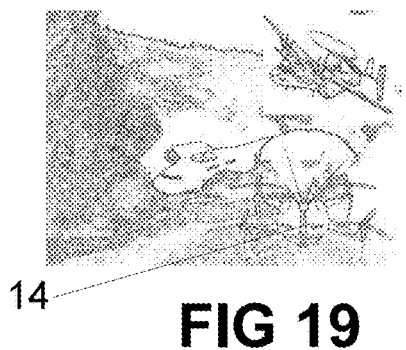
FIG. 19 illustrates a view where a reconnaissance airplane from the land's search rescue team arrives at the scene.

Now since the crash site can be easily located, contrary to the conventional system, first response team can be at the scene quicker for a preliminary assessment, as shown in FIGS. 17 and 19.

Figure 20:
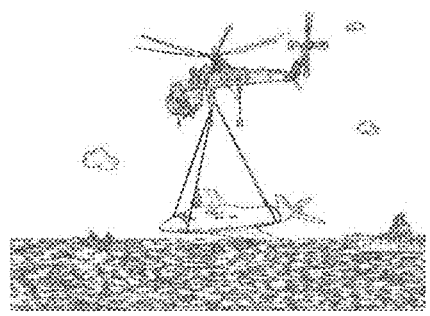
FIG. 20 shows a crashed aircraft being retrieved from the water by a heavy lifting helicopter.

On the other hand, the search and rescue team have a better chance in saving some lives by being on the crash site sooner, as depicted in FIG. 20.

What is claimed is:

1. An emergency response system for an airborne manned aerial vehicle (MAV), comprising;
    an unmanned aerial vehicle (UAV) having a physical connection and a wireless connection with the manned aerial vehicle, and also having a wireless communication connection to an air traffic control center;
    a manual and an automatic UAV launch trigger connected to a plurality of sensors enabled to detect an emergency situation in the MAV;
    wherein upon detection of the emergency situation by any one of an occupant of the MAV and the sensors, the manual launch trigger is configured to be initiated manually by the occupant and upon at least one of the sensors sensing the emergency situation, the automatic launch trigger is configured to be initiated automatically and once the UAV is launched it communicates at least location and flight conditions to the air traffic control center,
    wherein the UAV is automatically launched from the MAV when the sensors detect the emergency situations including a cockpit door tampering or breach, pilot error, and technical and mechanical failures of the MAV.

2. The system of claim 1, wherein the UAV would automatically be ejected from said airborne manned aerial vehicle (MAV) if the MAV is in an upside-down position or vice versa.

3. The system of claim 1, wherein the UAV would automatically be ejected from said flying airplane if a fire is detected within or on the MAV.

4. The system of claim 1, wherein the UAV establishes a three-way communication between the MAV, UAV and air traffic control center immediately after being ejected from the MAV.

5. The system of claim 1, wherein the UAV is configured to perform a plane's remote diagnostic after being separated from said flying plane.

6. The system of claim 1, wherein the UAV is equipped with a tracker system for the MAV enabling the UAV, after launch to track location of the MAV in air, land or water and communicate that location to the air traffic control center.

7. The system of claim 1, wherein the UAV is launched in an event the MAV becomes undetectable on a tracking or radar at the air traffic control center during flight.

8. The system of claim 1, wherein the emergency situation is remotely diagnosed by the air traffic control center for human error, and attempt a remote fix via the UAV.

9. The system of claim 1, wherein the UAV is separated from an immediate location of the MAV to rove above and track the MAV while sending the MAVs current location to the air traffic control center, enabling, by the air traffic control center access and retrieval of data, images, and video from inside and outside the MAV.

10. The system in claim 1, wherein the UAV tracks position and condition of the MAV until the MAV is landed.

* * * * *